UNITED STATES PATENT OFFICE.

CALISTA Z. TRUELL, OF LAWRENCE, MASSACHUSETTS, ASSIGNOR TO GREENWOOD CHEMICAL COMPANY, OF LOWELL, MASSACHUSETTS, A CORPORATION OF MASSACHUSETTS.

INSECTICIDE.

1,252,510.  Specification of Letters Patent.  Patented Jan. 8, 1918.

No Drawing.  Application filed April 8, 1909.  Serial No. 487,766.

*To all whom it may concern:*

Be it known that I, CALISTA Z. TRUELL, a citizen of the United States, residing at Lawrence, in the county of Essex and State of Massachusetts, have invented certain new and useful Improvements in Insecticides, of which the following is a specification.

This invention relates to compositions for destroying moths, bugs, lice and other insects which feed upon and destroy trees, plants and other vegetation.

My invention is a composition of matter preferably prepared in a certain form and to be used in a certain way which I will proceed to describe.

I preferably take one part by weight of glucose and place it in a suitable receptacle where I boil it about three minutes. I then stir in two parts by weight of powdered Paris green (copper aceto arsenite) until it is thoroughly mixed. I then stir in two parts by weight of Epsom salts (magnesium sulfate). When these ingredients are thoroughly mixed and form a hot paste similar to melted candy, the mixture is removed and shaped by any suitable process into short sticks or pencils which are rolled preferably in cream of tartar while still warm. This is to prevent them from sticking. They may then be separately rolled in paper for transportation.

Instead of copper arsenite, I can use lead arsenite or any other poison whether soluble or insoluble. Instead of the Epsom salts, I can use any other salt which is harmless to vegetation. If the poison used is relatively soluble, the salt used should be relatively insoluble for the reason hereafter described.

Instead of rolling the pencils in cream of tartar, I can roll them in saleratus, corn starch or other dry powder which will prevent them from sticking.

To use the pencils, I prefer to take the ordinary garden hose, unscrew the nozzle while the water is turned off and insert one or more pencils into the hose. After this I screw back the nozzle and turn on the water. Preferably the spray nozzle should be used or a nozzle the outlet of which is considerably smaller than the pencils, or a nozzle of which the passage is interrupted so that it is not continuously straight. This is to prevent the pencil from being driven out by the water, and this is a reason why a pencil is more effective than pellets or a poisonous compound of any other form. With the composition named in the form described, the water passing over the pencils will dissolve a sufficient quantity of the composition so that as it leaves the nozzle it will be well charged and can be turned upon trees, bushes, flowers, etc., delivering the poison thereon. The dissolved glucose aids in holding the composition to the leaves and branches.

With my invention, no apparatus whatever is needed except the garden hose and no power is required except the power of the water pressure.

My invention takes the place of the hand sprayers now used and is much more useful because it is less expensive, and because it will throw a poisonous spray to a greater distance and requires no manual power whatever.

It is evident that my pencils can be used at any point in a stream of water which comes from any source and is directed upon vegetation.

My composition should be so made by the proportioning of soluble and insoluble ingredients that it will dissolve readily but not too rapidly in a stream of cool or cold running water.

Any poison which kills pests to vegetation may be used in combination with an agent which is harmless to vegetation and which is tenacious and soluble in water, such as boiled glucose. With this I may combine a substance which is harmless to vegetation and which is relatively soluble or insoluble in water in an inverse proportion to the poison, whereby the solubility of the whole may be regulated.

What I claim as my invention and desire to cover by Letters-Patent is:—

1. The herein described composition of matter, consisting of copper aceto arsenite, magnesium sulfate, and glucose substantially as described and for the purpose specified.

2. The herein described composition of matter, consisting of copper aceto arsenite two parts by weight, magnesium sulfate two parts by weight, and boiled glucose one part by weight as described.

3. The herein described composition of matter, consisting of copper aceto arsenite two parts by weight, magnesium sulfate two parts by weight, and boiled glucose one part by weight in the form of pencils as described.

4. The herein described composition of matter, consisting of copper aceto arsenite, magnesium sulfate, and glucose as described and shaped into sticks or pencils.

5. A pencil for an insecticidal spray, comprising an insoluble insecticidal substance thoroughly intermixed with a soluble substance and formed into a pencil to be placed in a spray nozzle, the soluble substance being of a consistency to gradually dissolve in a manner to impregnate the passing stream of water with the required amount of insoluble insecticidal substance, for the purpose described.

In testimony whereof I hereto affix my signature in presence of two witnesses.

CALISTA Z. TRUELL.

Witnesses:
GARDNER W. PEARSON,
HELEN V. FLEMING.